April 11, 1939.  E. J. REISDORF  2,154,283
MEASURING DISPENSER
Filed Sept. 24, 1938
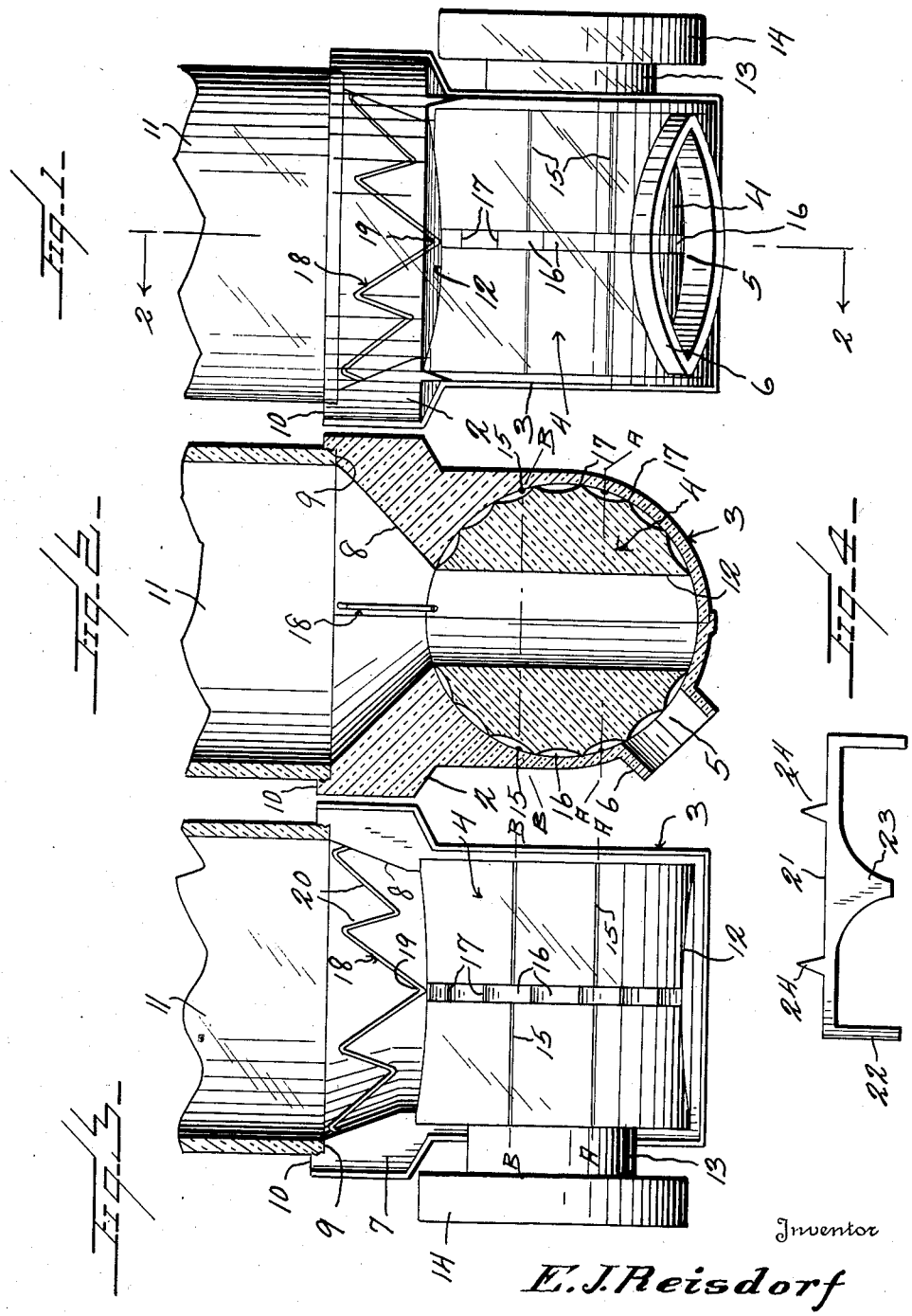
Inventor
E. J. Reisdorf
By Watson E. Coleman
Attorney Patented Apr. 11, 1939

2,154,283

UNITED STATES PATENT OFFICE 2,154,283

MEASURING DISPENSER

Edward J. Reisdorf, Seattle, Wash.

Application September 24, 1938, Serial No. 231,601

9 Claims. (Cl. 221—106)

This invention relates to improvements in dispensers for ground or granular material and pertains particularly to a device designed for dispensing coffee.

The present invention has for its primary object to provide a novel and improved coffee dispensing means by the use of which it is possible to measure out certain given quantities of coffee in a novel manner so that accurate measurements of the amount of coffee required for the brewing of a certain number of cups may be made.

Another object of the invention is to provide a coffee dispensing device in which a novel mechanism is made use of for agitating the coffee at the mouth of the receptacle from which it discharges into the measuring device so that a constant flow of the coffee into the measuring device will be assured.

Still another object of the invention is to provide a coffee measuring device which makes use of a cylindrical measuring body, in which the said measuring body and housing therefor are formed of transparent or semi-transparent material and the cylindrical body is grooved in such a manner as to pick up particles of coffee which will form in the grooves dark lines viewable through the casing for the cylinder and serve as guide means for measuring the quantity of coffee discharged into the rotary measuring device.

Still another object of the invention is to provide in a measuring device having a rotary material receiving member, a novel agitating means for stirring up or loosening the material at the mouth of the receptacle from which it discharges into the measuring device, which is engaged by ribs or members upon the rotary member so that as the member is turned, the agitating device will be operated.

The invention will be best understood from a consideration of the following detailed description taken in connection with the accompanying drawing forming part of this specification, with the understanding, however, that the invention is not to be confined to any strict conformity with the showing of the drawing but may be changed or modified so long as such changes or modifications mark no material departure from the salient features of the invention as expressed in the appended claims.

In the drawing:

Fig. 1 is a view in elevation of the dispenser device embodying the present invention, showing the same applied to a receptacle.

Fig. 2 is a sectional view on the line 2—2 of Fig. 1.

Fig. 3 is a view showing one-half of the dispenser device removed, showing the rotary cylinder therein.

Fig. 4 is a view of a modified form of a vibrator for use in the throat of the dispenser.

Referring now more particularly to the drawing, the numeral 1 generally designates the outer body portion or casing of the device embodying the present invention, this body portion comprising a top part or collar 2 and a lower cylinder housing 3. The casing as a whole is initially divided into two sections by which the insertion or placement into the housing of the cylinder 4 is accomplished, these sections being subsequently secured together in any suitable manner so that the cylinder will be retained in position for rotation but will be prevented from having any other movement.

The housing 4 may be of any desired shape but it is preferably rounded upon its underside to conform to the curvature of the cylinder which it encloses and the side wall of the housing to one side of the vertical longitudinal center is provided with the elongated elliptical opening 5 which is bordered by the outwardly extending similarly formed flange 6. This opening and the flange encircling it is arranged to open radially with respect to the center of the housing.

The upper portion of the housing merges into the thickened part 7 and the collar 2 and the said thickened part is formed to provide the downwardly tapering throat or chute 8 which at its lower end is of the same contour as the opening 5 and extends lengthwise of the housing above the cylinder 4. This throat is directed straight downwardly through the vertical center of the housing. The top inner part of the collar 2 is formed to provide the shoulder 9 surrounded by the interiorly threaded flange 10. This flange is provided to facilitate the attachment of the dispensing device to the mouth of a receptacle such as that indicated by the numeral 11. Such receptacle may be specially provided to contain coffee or other granular material or it may constitute the receptacle in which the commodity is sold.

The cylinder 4 is provided with the chamber or passage 12 which is of elliptical design with the long axis extending lengthwise of the cylinder. This chamber extends diametrically through the cylinder as shown in Fig. 2, and when the chamber or passage is in vertical position, its upper end conforms to the mouth of the throat 8. When the cylinder is turned so that the lower end of the chamber 12 lies over the discharge opening 5, the lower end will conform to the opening and the upper end of the chamber will be out of registry with the mouth of the throat 8. It will thus be seen that the chamber can never be arranged to form a communicating passage directly from the mouth of the material receiving throat and the outlet opening 5 in the wall of the casing.

At one end the cylinder 4 is provided with the reduced extension 13 which passes through a suitable opening in the end wall of the housing and terminates in the knob 14 by which turning of the cylinder is accomplished.

The exterior surface of the cylinder 4 is provided with a number of longitudinally extending grooves 15, in the present instance four, and these grooves are divided equally upon the two sides of the chamber 12 as shown in Fig. 3, there being two upon each side of the chamber. Extending circumferentially around the cylinder 4 midway of the ends is a ratchet 16 which is in the form of a narrow channel having at spaced intervals thereacross the ribs 17, the areas between the ribs being depressed or below the curved surface of the cylinder.

Within the throat portion 8 of the device there is positioned an agitator unit which is indicated generally by the numeral 18 and in the form shown in Fig. 3. This unit consists of a strand of spring wire which is bent to form a central point or tip 19 and a series of points 20 between the tip and each end. Each end of this agitator is secured in the wall of the throat 8 so that the agitator extends from one end of the throat to the other above the mouth of the throat and is so positioned that the tip or point 19 will extend into the ratchet area 16. Thus when the cylinder 4 is turned, the point 19 of the agitator will ride over the teeth or bars 17 of the ratchet and the points 20 of the agitator will be violently vibrated so as to stir or shake up the granular material in the throat and prevent it from packing so that it will not flow into the measuring chamber 12.

In practice, the casing 1 and the cylinder 4 are to be made of glass or of some other suitable transparent or semi-transparent material, amber glass being preferred. The chamber 12 is designed to contain a sufficient amount of coffee to make a specified number of cups. If the size of the chamber is sufficient to contain coffee for three cups of beverage, then the two grooves at one side of the cylinder divide the chamber lengthwise into three areas so that if the lower part of the chamber 12, when it is in vertical position as shown in Fig. 2, is allowed to receive coffee to the level of the first groove 15 or to the level indicated by the line A, then there will be sufficient coffee for the making of one cup of beverage. If the quantity of coffee extends to the line of the second groove 15, that is, the line B, then there will be a sufficient amount for the making of two cups of the beverage. It will, of course, be understood that the quantity specified and the number of lines stated are set forth merely for the purpose of illustrating the use of the device and that these factors may be changed as may be found desirable.

Because of the provision of the grooves in the surface of the cylinder 4 after the cylinder has been turned a few times, coffee will be caught or packed in the grooves and will then show through the transparent wall of the housing as a dark or black line and thus it will be easy to locate the lines and sight them across the housing and to determine when coffee has been allowed to run into the measuring chamber 12 to the extent desired. After the desired amount of coffee has been received in the chamber 12, the cylinder may then be turned so as to remove the upper end from registry with the mouth of the discharge throat 8 and to bring the lower end into registry with the outlet 5 so that the coffee may be discharged into a receiver. At the same time that the cylinder is turned, the agitator device 18 will be worked through the contact of the point 19 with the ratchet 16 and this will produce sufficient agitation of the entire mechanism to shake or loosen up the coffee in the throat and also to loosen it in the receptacle or measuring chamber 12 so that it will flow freely through the outlet 5. While the agitator 18 has been shown and described as being made of wire material, it is to be understood that it may be made of any other suitable material or in any other suitable form as, for example, one variation which might be made is as shown in Fig. 4. In this form, the agitator has been cut from a flat piece of metal so as to provide the horizontal bar 21 which at each end is turned to form the arms 22 which may be secured in the wall of the throat 8. Intermediate the ends of the bar 21 is a downwardly extending pointed portion 23 which has contact with the ratchet 16 and extending in the opposite direction from the bar are the points 24 which are embedded in the mass of coffee in the throat and which when vibrated back and forth through contact of the ratchet engaging point 23 with the high points of the ratchet when the cylinder is turned, loosen the coffee sufficiently to permit it to flow freely through the throat.

What is claimed is:

1. A fluent material dispenser of the character described, comprising a body having an upper part designed for attachment to the mouth of a fluent material receptacle and a lower housing portion, said upper part having a material receiving throat opening downwardly into the housing, said housing having a discharge opening in the lower part of the wall thereof, a rotary measuring means disposed within the housing and movable to one position to receive fluent material from said throat and to another position to discharge said material through said discharge opening, a vibrating agitator disposed within said throat, and means carried by said measuring means and engaging the agitator for effecting the continual vibration of the agitator while the measuring means is being turned.

2. A fluent material dispenser, comprising a body having an upper collar portion and a lower housing portion, said collar being designed for attachment to the mouth of a fluent material containing receptacle, a downwardly tapering throat in said collar portion discharging into said housing, said housing having an outlet in the lower part of the wall thereof, a rotatable body in the housing and having a chamber extending therethrough, said body chamber and outlet being so relatively arranged that when the chamber is in alinement at one end with the lower part of said throat it will be out of alinement with the outlet, a resiliently supported member disposed across said throat, and means carried by said rotary member engaging the resiliently supported member to impart vibratory movement thereto when the rotary member is turned.

3. A fluent material dispenser, comprising a body having a collar portion adapted for connection with the mouth of a material receptacle and a housing integral with the collar, said collar portion having a downwardly discharging opening leading into the housing, said housing having an outlet in the lower part of the wall thereof and at one side of the vertical center of the housing, a cylinder rotatable in said housing and having a passage extending diametrically therethrough, said cylinder passage when in vertical position being in registry at its upper end with the lower part of the downwardly discharging opening and out of registry with said outlet, and means for determining different quantities of the material flowing from said opening into said cylinder passage.

4. A fluent material dispenser, comprising a body having a collar portion adapted for connection with the mouth of a material receptacle and a housing integral with the collar, said collar portion having a downwardly discharging opening leading into the housing, said housing having an outlet in the lower part of the wall thereof and at one side of the vertical center of the housing, a cylinder rotatable in said housing and having a passage extending diametrically therethrough, said cylinder passage when in vertical position being in registry at its upper end with the lower part of the downwardly discharging opening and out of registry with said outlet, said housing being of transparent material, and said cylinder having longitudinal grooves in the circular surface thereof for trapping the fluent material to form a line of the same lengthwise of the cylinder which is viewable through the housing, the height of the material in the cylinder passage when the latter is vertically arranged, when coinciding with the plane of a line, indicating a predetermined quantity of the material.

5. A coffee dispensing device, comprising a body having an upper collar portion designed for attachment to the mouth of a coffee receptacle and a lower housing portion, said collar having a throat leading from the receptacle mouth into the housing, a rotatable cylinder within said housing, said cylinder having a chamber extending diametrically therethrough, said housing having an outlet in the lower part of the wall thereof at one side of the vertical longitudinal center thereof, said cylinder and housing being formed of a material having a degree of transparency, and coffee trapping grooves formed longitudinally in the surface of the cylinder and designating quantity levels of coffee in the passage when the latter is arranged vertically with the upper end in registry with said throat, the coffee trapped in said grooves being viewable through the material of the housing and the coffee flowing into the passage being viewable through the cylinder and the housing.

6. A coffee dispensing device, comprising a body having an upper collar portion designed for attachment to the mouth of a coffee receptacle and a lower housing portion, said collar having a throat leading from the receptacle mouth into the housing, a rotatable cylinder within said housing, said cylinder having a chamber extending diametrically therethrough, said housing having an outlet in the lower part of the wall thereof at one side of the vertical longitudinal center thereof, said cylinder and housing being formed of a material having a degree of transparency, and coffee trapping grooves formed longitudinally in the surface of the cylinder and designating quantity levels of coffee in the passage when the latter is arranged vertically with the upper end in registry with said throat, the coffee trapped in said grooves being viewable through the material of the housing and the coffee flowing into the passage being viewable through the cylinder and the housing, and means for effecting vibration of the dispenser device upon rotation of the cylinder to loosen up the coffee in the throat and in the passage.

7. A fluent material dispenser, comprising a body having a collar portion adapted for attachment to the mouth of a fluent material receptacle and a lower housing portion, said collar portion having a downwardly tapering throat opening into the housing, said housing having an outlet from the lower part thereof at one side of the vertical longitudinal center of said throat, a cylinder within the housing having a chamber extending diametrically therethrough, said chamber when vertically arranged being in registry at its upper end with the throat and out of registry with the outlet, and means for effecting agitation of the material in the throat comprising a body of resilient material extending across the throat and having a downwardly directed pointed portion and a ratchet formed circumferentially of the cylinder and engaged by said pointed portion whereby upon rotation of the cylinder the said body of resilient material will be vibrated.

8. In a dispenser for fluent material, a housing having an inlet and an outlet, a rotary valve member between the inlet and outlet and having a chamber in which material is received to be carried from the inlet to the outlet, a vibrator element in the inlet, and means carried by the valve member for engaging and constantly imparting movement to the said vibrator element during the turning of the valve member.

9. In a dispenser for fluent material, a housing having an inlet and an outlet, a rotary valve member between the inlet and outlet and having a chamber in which material is received to be carried from the inlet to the outlet, a vibrator element disposing across the inlet and having a portion extended into the area defined by the circumference of the rotary member, and a series of notches extending circumferentially of the member in which notches said extended portion of the vibrator element successively engages as the valve member is turned.

EDWARD J. REISDORF.